(12) United States Patent
Fjellstad et al.

(10) Patent No.: US 11,961,062 B2
(45) Date of Patent: Apr. 16, 2024

(54) METHODS AND APPARATUSES TO INDICATE OFF-PLATTER WEIGH CONDITIONS

(71) Applicant: ZEBRA TECHNOLOGIES CORPORATION, Lincolnshire, IL (US)

(72) Inventors: Christopher J. Fjellstad, Smithtown, NY (US); Edward Barkan, Miller Place, NY (US); Darran Michael Handshaw, Sound Beach, NY (US); Yuri Astvatsaturov, Lake Forest, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 319 days.

(21) Appl. No.: 17/218,379

(22) Filed: Mar. 31, 2021

(65) Prior Publication Data
US 2022/0318777 A1    Oct. 6, 2022

(51) Int. Cl.
*G06Q 20/20*      (2012.01)
*G01G 19/414*    (2006.01)
(Continued)

(52) U.S. Cl.
CPC ....... *G06Q 20/208* (2013.01); *G01G 19/4144* (2013.01); *G06K 7/1413* (2013.01); *H04W 12/06* (2013.01); *G06K 2007/10504* (2013.01)

(58) Field of Classification Search
CPC .. G06G 20/20; G06G 20/208; G07G 1/10018; G07G 1/0054; G01G 19/40;
(Continued)

(56) References Cited

U.S. PATENT DOCUMENTS

| 7,487,730 B2* | 2/2009 | Hedstrom | .......... B65D 19/0095 |
| | | | 108/57.17 |
| 8,556,175 B2* | 10/2013 | McQueen | ................. G01J 1/18 |
| | | | 235/462.43 |

(Continued)

FOREIGN PATENT DOCUMENTS

| EP | 3435274 A1 | 1/2019 |
| WO | 2009142985 A1 | 11/2009 |

OTHER PUBLICATIONS

Examination Report for Australian Application No. 2022200911 dated Jan. 23, 2023.
(Continued)

*Primary Examiner* — Andrew Joseph Rudy
(74) *Attorney, Agent, or Firm* — Yuri Astvatsaturov

(57) ABSTRACT

Example methods and apparatuses to indicate off-platter weigh conditions are disclosed herein. An example barcode reading and weighing apparatus includes a weigh platter; a scale; an off-platter detection assembly configured to detect an off-platter weigh condition; a processor in communication with the scale and the off-platter detection assembly; and a non-transitory machine-readable storage medium storing instructions that, when executed by the processor, cause the barcode reading and weighing apparatus to, responsive to detecting the off platter condition: compose a weight-conveying message, the weight-conveying message including (i) a weight-conveying field having the weight encoded therein and (ii) overhead information, the overhead information being operative, when the weight-conveying message is received by a POS system, to cause the POS system to not accept the weight for the transaction, the overhead information also not indicating the off-platter weigh condition to the POS system; and send the weight-conveying message to the POS system.

27 Claims, 4 Drawing Sheets

(51) Int. Cl.
G06K 7/14 (2006.01)
H04W 12/06 (2021.01)
G06K 7/10 (2006.01)

(58) Field of Classification Search
CPC .............. G01G 19/4144; G01G 19/415; G01G 23/3735; G01G 21/22; G01G 21/283; G06K 7/10; G06K 7/10722; G06K 9/00; G06K 9/00624; G06K 9/00355; G06T 7/13
USPC .......................................................... 705/23
See application file for complete search history.

(56) References Cited

U.S. PATENT DOCUMENTS

| | | | |
|---|---|---|---|
| 8,794,525 B2* | 8/2014 | Amundsen | G06K 7/10594 235/462.14 |
| 8,833,659 B2* | 9/2014 | McQueen | G01G 23/18 235/462.43 |
| 10,445,544 B2* | 10/2019 | Nunnink | G06K 7/10603 |
| 10,453,065 B2* | 10/2019 | Wagner | G06Q 20/4016 |
| 10,921,177 B1 | 2/2021 | Barkan et al. | |
| 11,397,104 B2* | 7/2022 | O'Donnell | G01G 21/28 |
| 2011/0232972 A1 | 9/2011 | McQueen et al. | |
| 2012/0105205 A1* | 5/2012 | Claessen | G07G 1/0018 235/462.13 |
| 2018/0032990 A1 | 2/2018 | Costello | |

OTHER PUBLICATIONS

Wikimedia Foundation, Inc. (2023, Feb. 18). Overhead. Wikipedia, the Free Encyclopedia. https://en.wikipedia.org/wiki/Overhead.

* cited by examiner ium storing instructions that, when executed by the processor, cause the barcode reading and weighing apparatus to, responsive to detecting the off platter condition: compose a weight-conveying message, the weight-conveying message including (i) a weight-conveying field having the weight encoded therein and (ii) overhead information, the overhead information being operative, when the weight-conveying message is received by the POS system, to cause the POS system to not accept the weight for the transaction, the overhead information also not indicating the off-platter weigh condition to the POS system; and send the weight-conveying message to the POS system via the communication interface.
METHODS AND APPARATUSES TO INDICATE OFF-PLATTER WEIGH CONDITIONS

BACKGROUND

One of the main functions of a weigh platter and scale, whether used alone or in conjunction with a barcode reader at a point-of-sale (POS) system, is to accurately weigh produce or other products that are priced by weight in order to assist in determining the price of the produce or product. However, produce and products are varied in shape and size and there can be issues where part of the produce or product sits on a surface off of the weigh platter, extends off the weigh platter, etc., resulting in inaccurate weight measurement and, therefore, incorrect pricing. Therefore, there is a need to be able to identify and indicate such off-platter weigh conditions to the POS system.

SUMMARY

Methods and apparatuses to indicate off-platter weigh conditions are disclosed herein. Examples and combinations thereof include at least the following.

In an embodiment, the present invention is a barcode reading and weighing apparatus operable to communicate, via a previously defined protocol, with a point-of-sale (POS) system that is operable to execute a transaction associated with a purchase of an item, the apparatus comprising: a weigh platter; a scale configured to measure a weight of the item on the weigh platter; an off-platter detection assembly configured to detect a portion of the item resting on a surface off the weigh platter resulting in a detection of an off-platter weigh condition; a communication interface configured to communicate with the POS system; a processor in communication with the scale, the off-platter detection assembly, and the communication interface; and a non-transitory machine-readable storage medium storing instructions that, when executed by the processor, cause the barcode reading and weighing apparatus to, responsive to detecting the off platter condition: compose a weight-conveying message, the weight-conveying message including (i) a weight-conveying field having the weight encoded therein and (ii) overhead information, the overhead information being operative, when the weight-conveying message is received by the POS system, to cause the POS system to not accept the weight for the transaction, the overhead information also not indicating the off-platter weigh condition to the POS system; and send the weight-conveying message to the POS system via the communication interface.

In another embodiment, the present invention is a method of weighing an item with a barcode reading and weighing apparatus, the method comprising: determining a weight of an item on a weigh platter of the barcode reading and weighing apparatus; detecting whether a portion of the item is resting on a surface off the weigh platter resulting in a detection of an off-platter weigh condition; and when the off-platter weigh condition is detected: composing a weight-conveying message, the weight-conveying message including (i) a weight-conveying field having the weight encoded therein and (ii) overhead information, the overhead information being operative, when the weight-conveying message is received by a point-of-sale (POS) system, to cause the POS system to not accept the weight for the transaction, the overhead information also not indicating the off-platter weigh condition to the POS system; and sending the weight-conveying message to the POS system via a communication interface.

In yet embodiment, the present invention is a non-transitory machine-readable storage medium storing instructions that, when executed by the processor, cause a barcode reading and weighing apparatus to determine a weight of an item on a weigh platter of the barcode reading and weighing apparatus; detect whether a portion of the item is resting on a surface off the weigh platter resulting in a detection of an off-platter weigh condition; and when the off-platter weigh condition is detected: compose a weight-conveying message, the weight-conveying message including (i) a weight-conveying field having the weight encoded therein and (ii) overhead information, the overhead information being operative, when the weight-conveying message is received by a point-of-sale (POS) system, to cause the POS system to not accept the weight for the transaction, the overhead information also not indicating the off-platter weigh condition to the POS system; and send the weight-conveying message to the POS system via a communication interface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
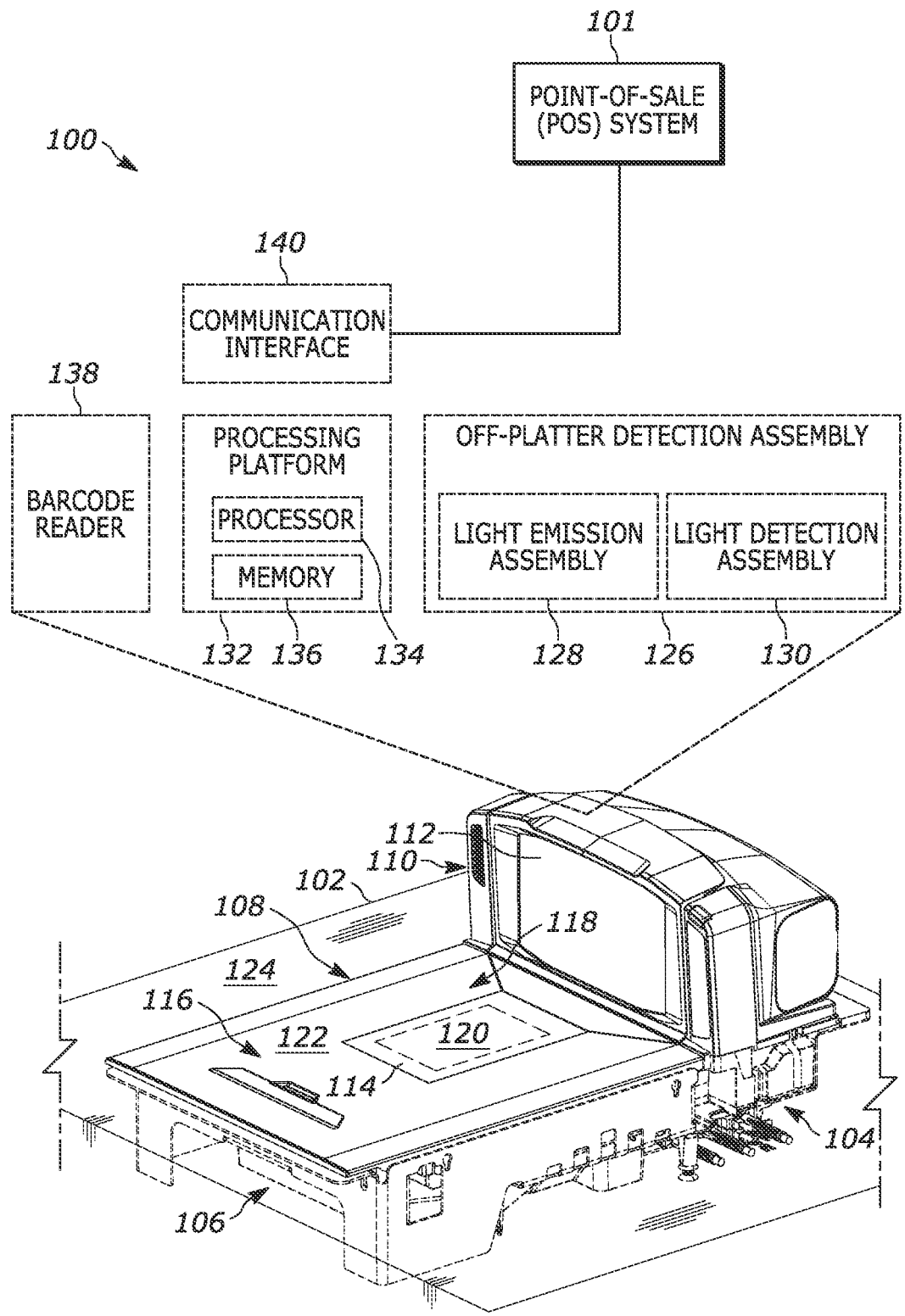
FIG. 1 illustrates an example barcode reading and weighing apparatus, in accordance with aspects of described embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reference will now be made in detail to non-limiting examples, some of which are illustrated in the accompanying drawings.

The examples disclosed herein relate to methods and apparatuses to indicate off-platter weigh conditions for barcode reading and weighing apparatus, such as bioptic barcode readers, having off-platter detection assemblies to identify when an object extends off of a weigh platter of the barcode reading and weighing platter apparatus onto a nearby surface, and indicate such off-platter weigh conditions to a point-of-sale (POS) system of a retail store.

FIG. 1 illustrates an example barcode reading and weighing apparatus 100, such as the Zebra® MP7000 bioptic barcode reader. The barcode reading and weighting apparatus 100 provides weights of weighed items and/or barcodes of scanned items to a POS system 101. The barcode reading and weighing apparatus 100 conveys item weights by sending weight-conveying messages to the POS system 101, wherein the weight-conveying messages are structured in accordance with a predefined protocol implemented by the barcode reading and weighing apparatus 100 and the POS system 101. The POS system 101 executes retail transactions for weight-based items based on weight-conveying messages received from the barcode reading and weighing apparatus 100.

Figure 2:
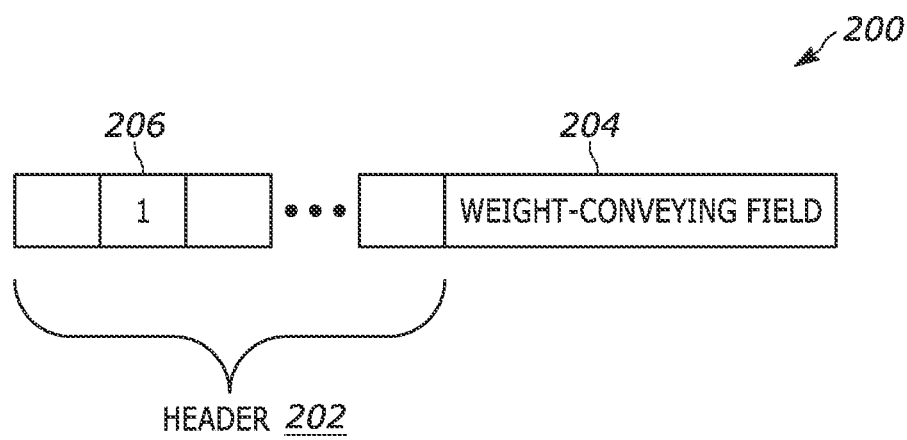
FIG. 2 illustrates an example weight-conveying message, in accordance with aspects of described embodiments.

FIG. 2 illustrates an example weight-conveying message 200 that may be generated by the weighing apparatus 100 for communication to the POS system 101, in FIG. 1. In the illustrated example, the weight-conveying message 200 includes an example header 202 and an example weight-conveying field 204. Weights may be encoded in the weight-conveying field 204 using binary encoding, decimal encoding, etc. The header 202 includes overhead information (e.g., one or more bits, bytes, fields, etc.) that is operative (e.g., may be set to one or more states) to provide one or more secondary indications to the POS system 101 according to a predefined protocol implemented by the barcode reading and weighting apparatus 100 and the POS system 101. Some predefined overhead status bits, bytes, fields, etc. are defined to indicate that a weigh condition exists that does or may result in a weight encoded in the weight-conveying field 204 being inaccurate. For example, a "scale in motion" status bit 206 of an example predefined protocol indicates that a weight encoded in the weight-conveying field 204 is or may be inaccurate because its weight is changing, fluctuating, etc. According to the predefined protocol, a POS system 101 receiving a weight-conveying message in which the "scale in motion" status bit 206 is set (e.g., set to a binary value of one) is to ignore a weight encoded in the weight-conveying field 204. When a weight-conveying message in which the "scale in motion" status bit is cleared (e.g., set to a binary value of zero) is received and no other inaccurate weight indicating status bit is set, the POS system 101 may use the weight encoded in the weight-conveying field 204 to charge a customer for an item based on the weight. Other example status bits of predefined protocols that indicate that a weight encoded in the weight-conveying field 204 is or may be inaccurate include a "weight data not included" status bit, a "scale under zero" status bit, a "scale over capacity" status bit, and a "read error" status bit.

Existing predefined protocols for weight-conveying messages do not include indications for off-platter weigh conditions. Because an off-platter weigh condition results in an inaccurate, invalid, etc. weight, disclosed methods and apparatuses utilize or "hi-jack" a predefined overhead bit, byte, field, etc. that signifies an inaccurate weight, albeit due to another cause (e.g., scale in motion, etc.), to convey the off-platter weigh condition. While use of the predefined overhead bit, byte, field, etc. does not accurately convey the reason for the inaccurate weight to the POS system 101, use of the predefined overhead bit, byte, field, etc. can still result in the POS system 101 typically taking an appropriate action (e.g., ignore the weight encoded in the weight-conveying field 204) for an off-platter weigh condition.

In some examples, different POS systems 101 are implemented in accordance with different predetermined weight-conveying message protocols. However, the barcode reading and weighing apparatus 100 may be configurable to support different POS systems 101 and, thus, different predetermined protocols. In some examples, the barcode reading and weighing apparatus 100 can interact with the POS system 101 to automatically identify the POS system 101 and/or the predetermined weight-conveying protocol used by the POS system 101. In some examples, the barcode reading and weighing apparatus 100 can be configured to the POS system 101 at, for example, installation by scanning a barcode associated with the POS system 101. Additionally and/or alternatively, the POS system 101 may be identified based on information received from the POS system 101 (e.g., a signal, a message, overhead, etc.). The information may be received wirelessly and/or via a cable communicatively coupling the barcode reading and weighing apparatus 100 and the POS system 101. Based on the identification of the POS system 101, the barcode reading and weighing apparatus 100 can identify the predetermined weight-conveying protocol used by the POS system 101, and then select and use or "hi-jack" one or more overhead bits, bytes, fields, etc. of the protocol that indicate an inaccurate weight, regardless of reason why, to indicate off-platter weigh conditions. In this way, off-platter weigh conditions can result in potentially inaccurate weights being ignored by POS systems 101.

Returning to FIG. 1, the barcode reading and weighing apparatus 100 can be configured to be physically supported by a workstation 102, such as a checkout counter at a POS of a retail store. The barcode reading and weighing apparatus 100 has an example housing 104 that includes an example lower housing 106 that houses an example weigh platter assembly 108, and an example upper housing 110 that extends generally perpendicular to the lower housing 106. The upper housing 110 includes an example generally vertical window 112 to allow a first set of optical components positioned within the upper housing 110 to form a first field-of-view (FOV) through the vertical window 112. In addition, if the barcode reading and weighing apparatus 100 is a bioptic barcode scanner, the lower housing 106 will include a generally horizontal window 114, which is positioned in a weigh platter 116 of the weigh platter assembly 108 to allow a second set of optical components positioned within lower housing 106 to form a second FOV through the horizontal window 114. The first FOV and second FOV intersect to define a product scanning region 118 of the barcode reading and weighing apparatus 100 where a product can be scanned for sale at the POS.

Although the weigh platter assembly 108 can be used with a barcode scanner or bioptic barcode reader, the weigh platter assembly 108 can be used with any type of scanner, reader or POS system 101, or can be used as a stand-alone scale or weighing device. Whether used as part of a barcode reader, scanner or POS system 101, or as a stand-alone scale or weighing device, the weigh platter assembly 108 will generally include the weigh platter 116 and an example scale 120 configured to measure the weight of an object placed on a surface 122 of the weigh platter 116. The surface 122 extends in a first transverse plane and is generally or substantially parallel to an example top surface 124 of the workstation 102 that at least partially surrounds the weigh platter 116.

To detect an off-platter weigh condition, the barcode reading and weighing apparatus 100 includes an example off-platter detection assembly 126. The off-platter detection assembly 126 includes an example light emission assembly 128, and an example light detection assembly 130. An example processing platform 132 is in communication with the light emission assembly 128 and the light detection assembly 130 and/or, more generally, the off-platter detection assembly 126. The processor platform 132 is in communication with a light source (not shown for clarity of illustration) of the light emission assembly 128, and with a light sensor (not shown for clarity of illustration) of the light detection assembly 130. If the light source of the light emission assembly 128 is configured by the processing platform 132 to emit light (e.g., one or more pulses of light), the processing platform 132 can process light detection information captured by the light detection assembly 130 to detect when a portion of an item, object, etc. is resting on a surface other than the surface 122 of the weigh platter 116 (e.g., on the top surface 124 of the workstation 102) as an off-platter weigh condition, extends beyond edge of weigh platter 116, etc. For simplicity, only a single light emission assembly 128 and only a single light detection assembly 130 are shown and described herein, however, it will be understood that off-platter detection assembly 126 can also include any number and/or type(s) of light emission assemblies, and any number and/or type(s) light detection assemblies may be implemented to detect off-platter weigh condition on different sides of the weigh platter 116.

The example processing platform 132 includes a processor 134 such as programmable processor, a programmable controller, a graphics processing unit (GPU), a digital signal processor (DSP), etc. Alternatively, an application specific integrated circuit (ASIC), a programmable logic device (PLD), a field programmable gate array (FPGA), a field programmable logic device (FPLD), a logic circuit, etc. may be structured or configured to implement the processing platform 132 and/or the processor 134. The processor platform 132 includes memory 136 to store software, logic, and/or machine-readable instructions that may be executed by the processor 134. Example memory 136 includes any number or type(s) of non-transitory machine-readable storage medium or disk, such as a hard disk drive (HDD), an optical storage drive, a solid-state storage device, a solid-state drive (SSD), a read-only memory (ROM), a random-access memory (RAM), a compact disc (CD), a compact disc read-only memory (CD-ROM), a digital versatile disk (DVD), a Blu-ray disk, a cache, a flash memory, or any other storage device or storage disk in which information may be stored for any duration (e.g., permanently, for an extended time period, for a brief instance, for temporarily buffering, for caching of the information, etc.). The processing platform 500 shown in FIG. 5 may be used to implement the processing platform 132.

To read, capture, scan, etc. machine-readable codes in the form of numbers and/or a pattern of parallel lines of varying widths, printed on and identifying a product (e.g., a barcode), the barcode reading and weighing apparatus 100 includes a barcode reader 138, a scanner, etc. Barcodes read by the barcode reader 138 are provided to the processing platform 132.

To communicatively couple the barcode reading and weighing apparatus 100 to other systems, such as the POS system 101, the barcode reading and weighing apparatus 100 includes one or more communication interfaces, one of which is designated at reference numeral 140. The processing platform 132 can communicate with other systems, such as a POS system 101, via the communication interface 140. The communication interface 140 may communicate with the POS system 101 wirelessly, and/or via a cable communicatively coupling the barcode reading and weighing apparatus 100 and the POS system 101.

Weight-conveying messages, such as the message 200 of FIG. 2, may be sent by the processing platform 132 to the POS system 101 via the communication interface 140. When the processing platform 132 detects an off-platter weigh condition, the processing platform 132 composes a weight-conveying message, and utilizes or "hi-jacks" a predefined overhead bit, byte, field, etc. of the weight-conveying message that signifies an inaccurate weight, albeit due to another cause (e.g., scale in motion, etc.), to convey the off-platter weigh condition to the POS system 101. This weight-conveying message with the "hi-jacked" overhead bit, byte, field, etc. is sent to the POS system 101 to cause the POS system 101 to ignore any weight encoded in a weight-conveying field of the weight-conveying message, although the POS system 101 believes it is ignoring the weight for a condition other than an off-platter weigh condition.

In some examples, the processing platform 132 presents an indication of the off-platter weigh condition at the barcode reading and weighing apparatus 100. The indication may indicate on which side of the weigh platter (e.g., right, left, front, back) a portion of the item is resting on another surface off the weigh platter 116. Example indications include an audible alert beep, light emitted by a light-emitting diode (LED), an audible message played through a speaker, a message displayed on an external pole display, or an alpha-numeric character (e.g., "R", "L", etc.) displayed through a barcode scanner window (e.g., the window 112), etc.

When the processing platform 132 does not detect an off-platter weigh condition, the processing platform 132 composes a weight-conveying message, but does not set or "hi-jack" the predefined overhead bit, byte, field, etc. of the weight-conveying message. This weight-conveying message, absent some other inaccurate weight condition causing an overhead bit, byte, field, etc. to be set, will enable the POS system 101 to charge a customer for an item based on the weight encoded in a weight-conveying field of the weight-conveying message.

While an barcode reading and weighing apparatus 100 is shown in FIG. 1, one or more of the elements, processes, components, devices, etc. illustrated in FIG. 1 may be combined, divided, re-arranged, omitted, eliminated or implemented in any other way. Further, the barcode reading and weighing apparatus 100 may include one or more elements, processes, components, devices, etc. in addition to, or instead of, those illustrated in FIG. 1, or may include more than one of any or all of the illustrated elements, processes, components, devices, etc.

Figure 3:
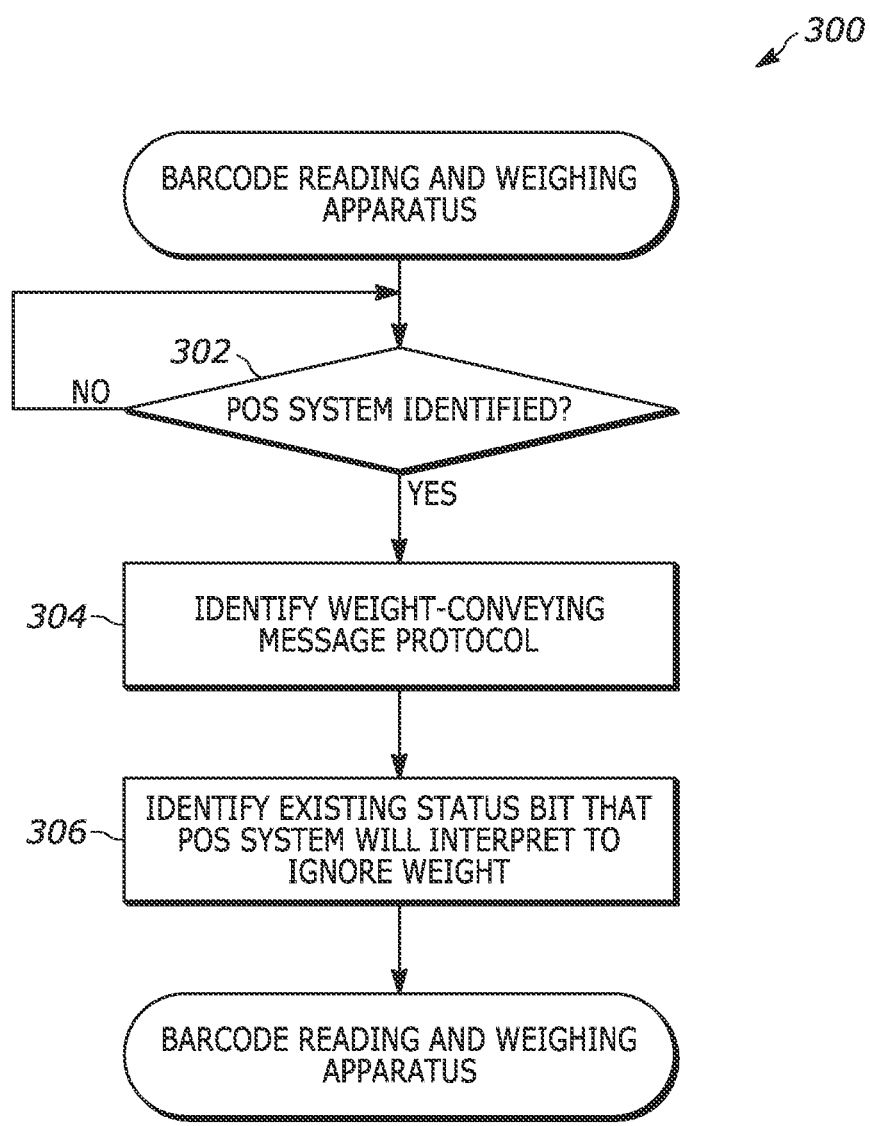
FIG. 3 is a flowchart representative of example methods, logic or machine-readable instructions for implementing the example barcode reading and weighing apparatus of FIG. 1, in accordance with aspects of described embodiments.

A flowchart 300 representative of example processes, methods, logic, software, machine- or machine-readable instructions for implementing the barcode reading and weighing apparatus 100 is shown in FIG. 3. The program of FIG. 3 begins at block 302. If the barcode reading and weighing apparatus 100 (e.g., the processing platform 132) identifies a POS system (e.g., the POS system 101), the barcode reading and weighing apparatus 100 identifies the pre-determined weight conveying protocol being used by the POS system (block 304). In some examples, the barcode reading and weighing apparatus 100 interacts with the POS system 101 to automatically identify the POS system 101 and/or the predetermined weight-conveying protocol used by the POS system 101. In some examples, the barcode reading and weighing apparatus 100 can be configured to the POS system 101 and/or the predetermined weight-conveying protocol used by the POS system 101 at, for example, installation by scanning a barcode associated with the POS system 101 and using a payload of the barcode to identify the POS system 101 and/or the predetermined weight-conveying protocol used by the POS system 101. Additionally and/or alternatively, the POS system 101 and/or the predetermined weight-conveying protocol used by the POS system 101 may be identified based on information received from the POS system 101 (e.g., a signal, a message, overhead, etc.). The information may be received wirelessly and/or via a cable communicatively coupling the barcode reading and weighing apparatus 100 and the POS system 101.

Based on the predetermined weight-conveying protocol used by the POS system 101, the barcode reading and weighing apparatus 100 selects one or more predefined overhead bits, bytes, fields, etc. of the protocol that indicate an inaccurate weight for a reason other than an off-platter weigh condition (block 306) to use to convey off-platter weigh conditions. Control then exits from the example program of FIG. 3.

Figure 4:
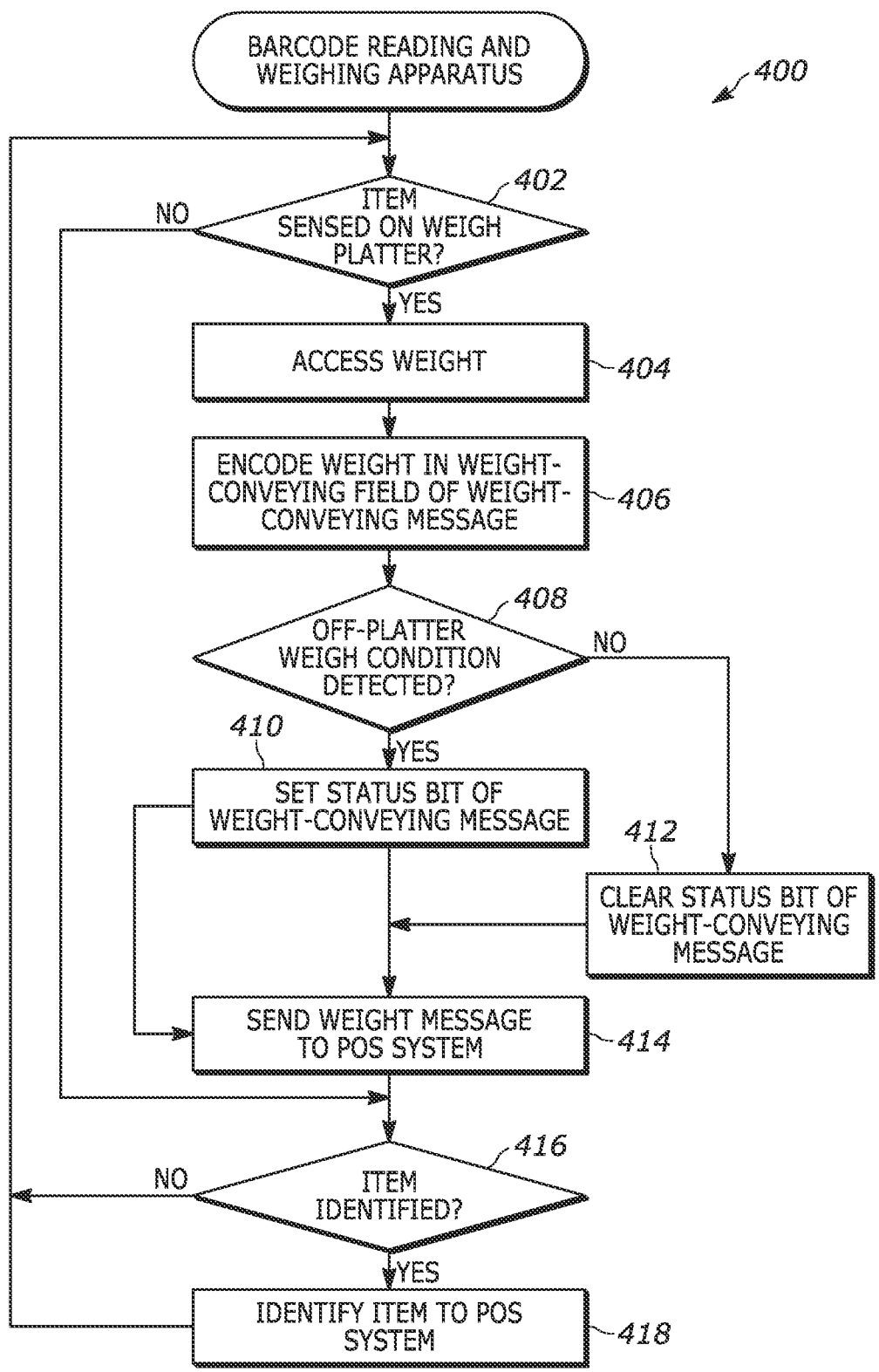
FIG. 4 is a flowchart representative of further example methods, logic or machine-readable instructions for implementing the example barcode reading and weighing apparatus of FIG. 1, in accordance with aspects of described embodiments.

A flowchart 400 representative of example processes, methods, logic, software, machine- or machine-readable instructions for implementing the barcode reading and weighing apparatus 100 is shown in FIG. 4. The program of FIG. 4 begins at block 402. If the barcode reading and weighing apparatus 100 (e.g., the processing platform 132) detects an item is on the weigh platter 116 (e.g., by registering a weight via the scale 120) (block 402), the processing platforms 132 accesses (e.g., reads, obtains, retrieves, etc.) the weight (block 404) and encodes the weight into the weight-conveying field of a weight-conveying message (block 406). If the off-platter detection assembly 126 detects an off-platter weigh condition (block 408), the barcode reading and weighing apparatus 100 utilizes or "hi-jacks" (e.g., sets to a binary value of one) a predefined overhead bit, byte, field, etc. of the weight-conveying message (e.g., identified using the program of FIG. 3) that signifies an inaccurate weight, albeit due to another cause (e.g., scale in motion, etc.), to indicate to the POS system 101 that the weight should be ignored (block 410). Otherwise, the barcode reading and weighing apparatus 100 does not "hi-jack" (e.g., set to a binary value of zero) the predefined overhead bit, byte, field, etc. (block 412).

The barcode reading and weighing apparatus 100 sends the weight-conveying message to, for example, the POS system 101 via the communication interface 140 (block 414). If a barcode or other product marking was identified by the barcode reader 138, if an item was identified using computer vision, or a user identified an item by, for example, entering a code or selecting an item in a list (block 416), the barcode reading and weighing apparatus 100 identifies the item to, for example, the POS system 101 via the communication interface 140 (block 420). Control returns to block 402 to wait for another item to be placed on the weigh platter 116 or an item to be identified. Together and/or separately, the modified weight and/or the barcode can be used to charge for the item and/or verify the item.

Returning to block 402, if an item is not on the weigh platter 116 (block 402), control proceeds to block 416 to determine whether a barcode was identified (block 416).

While the example flowchart of FIG. 4 includes the detection and handling of barcodes, such functionality may be omitted.

Figure 5:
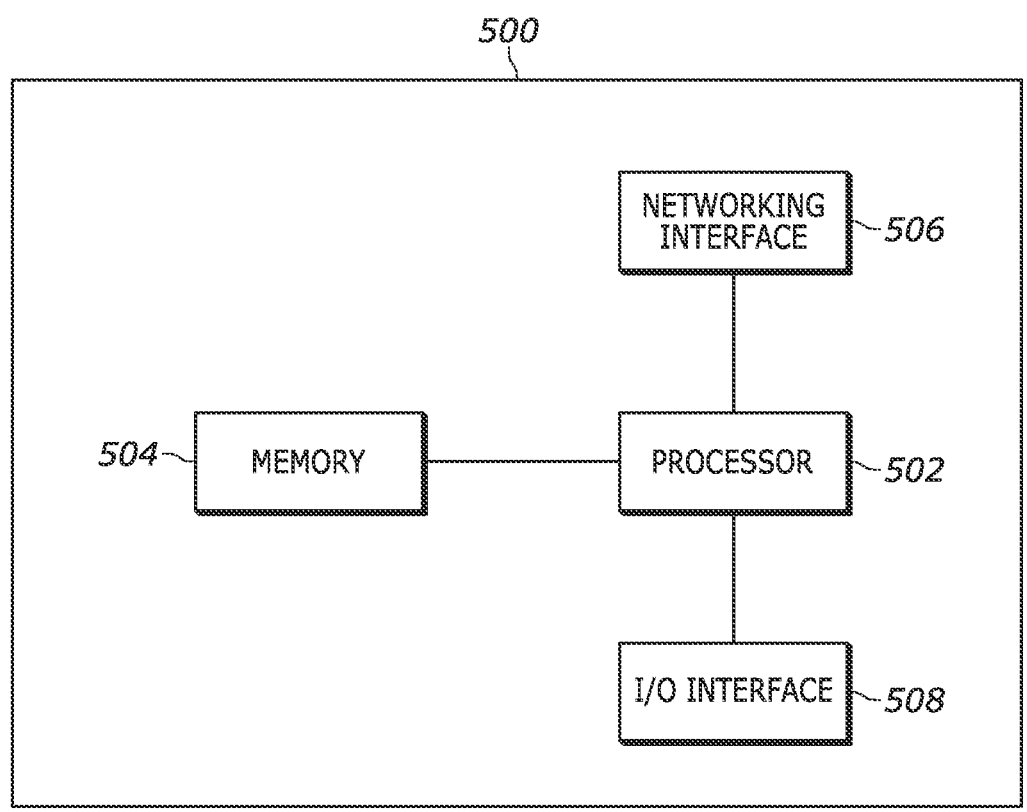
FIG. 5 is a block diagram of an example logic circuit to implement the example methods, apparatus, logic and/or operations described herein.

The processes, methods, logic, software and instructions of FIGS. 3 and 4 may be an executable program or portion of an executable program for execution by a processor such as the processor 502 of FIG. 5. The program may be embodied in software or instructions stored on a non-transitory machine- or machine-readable storage device, storage medium and/or storage disk such as a memory, a CD, a compact disc read-only memory CD-ROM, a hard drive, an SSD, a DVD, a Blu-ray disk, a cache, a flash memory, a ROM, a RAM, or any other storage device, medium or storage disk associated with the processor 502 in which information is stored for any duration (e.g., for extended time periods, permanently, for brief instances, for temporarily buffering, and/or for caching of the information). Further, although example programs are described with reference to the flowchart 300 illustrated in FIG. 3 and the flowchart 400 illustrated in FIG. 4, many other methods of implementing the barcode reading and weighing apparatus 100 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, hardware logic, hardware implemented state machines, etc.) structured to perform the corresponding operation without executing software or instructions.

FIG. 5 is a block diagram representative of an example logic circuit capable of implementing, for example, one or more components of the example processing platform 132 and/or, more generally, the barcode reading and weighing apparatus 100 of FIG. 1. The example logic circuit of FIG. 5 is a processing platform 500 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 500 of FIG. includes a processor 502 such as, for example, one or more microprocessors, controllers, and/or any suitable type of processor. The example processing platform 500 of FIG. 5 includes memory (e.g., volatile memory, non-volatile memory) 504 accessible by the processor 502 (e.g., via a memory controller). The example processor 502 interacts with the memory 504 to obtain, for example, machine-readable instructions stored in the memory 504 corresponding to, for example, the operations represented by the flowcharts of this disclosure. Additionally or alternatively, machine-readable instructions corresponding to the example operations described herein may be stored on one or more removable media (e.g., a CD, a DVD, removable flash memory, etc.) that may be coupled to the processing platform 500 to provide access to the machine-readable instructions stored thereon.

The example processing platform 500 of FIG. 5 also includes a network interface 506 to enable communication with other machines via, for example, one or more networks. The example network interface 506 includes any suitable type of communication interface(s) (e.g., wired and/or wireless interfaces) configured to operate in accordance with any suitable protocol(s). The network interface 506 may be used to implement the communication interface 140.

The example, processing platform 500 of FIG. 5 also includes input/output (I/O) interfaces 508 to obtain weights from the scale 120, obtain off-platter weigh condition indications, interact (e.g., control and receive data from) with barcode reader 138, interact the off-platter detection assembly 126, interact with the light emission assembly 128, interact the light detection assembly 130, to interact with the POS system 101, to enable receipt of user input and communication of output data to the user, etc. The I/O interfaces 508 may be used to implement the communication interface 140.

Although FIG. 5 depicts the I/O interfaces 508 as a single block, the I/O interfaces 508 may include a number of different types of I/O circuits or components that enable the processor 502 to communicate with peripheral I/O devices. Example I/O interfaces 508 include a universal serial bus (USB), a Bluetooth® interface, a near field communication (NFC) interface, and/or a PCI Express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The embodiments disclosed herein can be particularly advantageous in that a POS system may be caused to ignore a potentially inaccurate weight without having to report a weight that is different than the weight actually recorded by the weight platter and scale. Thus, the methods and apparatuses disclosed herein may be advantageously practiced even in the presence of regulations regarding the reporting of weights.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A barcode reading and weighing apparatus operable to communicate, via a previously defined protocol, with a point-of-sale (POS) system that is operable to execute a transaction associated with a purchase of an item, the apparatus comprising:
    a weigh platter;
    a scale configured to measure a weight of the item on the weigh platter;
    an off-platter detection assembly configured to detect a portion of the item resting on a surface off the weigh platter resulting in a detection of an off-platter weigh condition;
    a communication interface configured to communicate with the POS system;
    a processor in communication with the scale, the off-platter detection assembly, and the communication interface; and
    a non-transitory machine-readable storage medium storing instructions that, when executed by the processor, cause the barcode reading and weighing apparatus to, responsive to detecting the off platter condition:
        compose a weight-conveying message, the weight-conveying message including (i) a weight-conveying field having the weight encoded therein and (ii) overhead information, the overhead information being operative, when the weight-conveying message is received by the POS system, to cause the POS system to not accept the weight for the transaction, the overhead information also not indicating the off-platter weigh condition to the POS system; and
        send the weight-conveying message to the POS system via the communication interface.

2. The barcode reading and weighing apparatus of claim 1, wherein the instructions, when executed by the processor, cause the barcode reading and weighing apparatus to, when no off-platter weigh condition is detected:
    compose the weight-conveying message, the weight-conveying message including (i) the weight-conveying field having the weight encoded therein and (ii) second overhead information, the second overhead information being operative, when the weight-conveying message is received by the POS system, to cause the POS system to accept the weight for the transaction; and
    send the weight-conveying message to the POS system via the communication interface.

3. The barcode reading and weighing apparatus of claim 1, wherein the instructions, when executed by the processor, cause the barcode reading and weighing apparatus to:
    determine an identity of the POS system;
    identify the previously defined protocol based on an identity of the POS system; and
    select the overhead information as one of a plurality of predefined status bits of the protocol.

4. The barcode reading and weighing apparatus of claim 3, wherein the instructions, when executed by the processor, cause the barcode reading and weighing apparatus to determine the identity of the POS system in response to a configuring of the barcode reading and weighing apparatus.

5. The barcode reading and weighing apparatus of claim 3, wherein the instructions, when executed by the processor, cause the barcode reading and weighing apparatus to:
    read a barcode associated with the POS system; and
    determine the identity of the POS system based upon a payload of the barcode.

6. The barcode reading and weighing apparatus of claim 3, wherein the instructions, when executed by the processor, cause the barcode reading and weighing apparatus to:
    receive a wireless signal from the POS system; and
    determine the identity of the POS system based upon the wireless signal.

7. The barcode reading and weighing apparatus of claim 3, wherein the instructions, when executed by the processor, cause the barcode reading and weighing apparatus to:
    receive a signal from the POS system over a cable coupling the barcode reading and weighing apparatus and the POS system; and
    determine the identity of the POS system based upon the signal.

8. The barcode reading and weighing apparatus of claim 1, wherein the instructions, when executed by the processor, cause the barcode reading and weighing apparatus to provide at the barcode reading and weighing apparatus an indication of the off-platter weigh condition.

9. The barcode reading and weighing apparatus of claim 8, wherein the indication indicates on which side of the weigh platter the portion of the item is resting on the second surface.

10. The barcode reading and weighing apparatus of claim 8, wherein the indication includes at least one of an alert beep, emitted light, an audible message, a message displayed on an external pole display, or a character displayed through a barcode scanner window.

11. The barcode reading and weighing apparatus of claim 1, wherein the overhead information is a status bit of the previously defined protocol.

12. The barcode reading and weighing apparatus of claim 11, wherein the status bit, when set, indicates the weight encoded in the weight-conveying field is inaccurate due to a condition other than the off-platter weigh condition.

13. The barcode reading and weighing apparatus of claim 11, wherein the status bit is at least one of a "scale in motion" status bit, a "weight data not included" status bit, a "scale under zero" status bit, a "scale over capacity" status bit, or a "read error" status bit.

14. A method of weighing an item with a barcode reading and weighing apparatus, the method comprising:
   determining a weight of an item on a weigh platter of the barcode reading and weighing apparatus;
   detecting whether a portion of the item is resting on a surface off the weigh platter resulting in a detection of an off-platter weigh condition; and
   when the off-platter weigh condition is detected:
      composing a weight-conveying message, the weight-conveying message including (i) a weight-conveying field having the weight encoded therein and (ii) overhead information, the overhead information being operative, when the weight-conveying message is received by a point-of-sale (POS) system, to cause the POS system to not accept the weight for the transaction, the overhead information also not indicating the off-platter weigh condition to the POS system; and
      sending the weight-conveying message to the POS system via a communication interface.

15. The method of claim 14, further comprising, when no off-platter weigh condition is detected:
   composing the weight-conveying message, the weight-conveying message including (i) the weight-conveying field having the weight encoded therein and (ii) second overhead information, the second overhead information being operative, when the weight-conveying message is received by the POS system, to cause the POS system to accept the weight for the transaction; and
   sending the weight-conveying message to the POS system via the communication interface.

16. The method of claim 14, further comprising:
   determining an identity of the POS system;
   identifying the previously defined protocol based on an identity of the POS system; and
   selecting the overhead information as one of a plurality of predefined status bits of the protocol.

17. The method of claim 14, further comprising providing at the barcode reading and weighing apparatus an indication of the off-platter weigh condition.

18. The method of claim 14, wherein the overhead information is a status bit of the previously defined protocol.

19. The method of claim 18, wherein the status bit, when set, indicates the weight encoded in the weight-conveying field is inaccurate due to a condition other than the off-platter weigh condition.

20. The method of claim 18, wherein the status bit is at least one of a "scale in motion" status bit, a "weight data not included" status bit, a "scale under zero" status bit, a "scale over capacity" status bit, or a "read error" status bit.

21. A non-transitory machine-readable storage medium storing instructions that, when executed by the processor, cause a barcode reading and weighing apparatus to:
   determine a weight of an item on a weigh platter of the barcode reading and weighing apparatus;
   detect whether a portion of the item is resting on a surface off the weigh platter resulting in a detection of an off-platter weigh condition; and
   when the off-platter weigh condition is detected:
      compose a weight-conveying message, the weight-conveying message including (i) a weight-conveying field having the weight encoded therein and (ii) overhead information, the overhead information being operative, when the weight-conveying message is received by a point-of-sale (POS) system, to cause the POS system to not accept the weight for the transaction, the overhead information also not indicating the off-platter weigh condition to the POS system; and
      send the weight-conveying message to the POS system via a communication interface.

22. The non-transitory machine-readable storage medium of claim 21, wherein the instructions, when executed by the processor, cause a barcode reading and weighing apparatus to, when no off-platter weigh condition is detected:
   compose the weight-conveying message, the weight-conveying message including (i) the weight-conveying field having the weight encoded therein and (ii) second overhead information, the second overhead information being operative, when the weight-conveying message is received by the POS system, to cause the POS system to accept the weight for the transaction; and
   send the weight-conveying message to the POS system via the communication interface.

23. The non-transitory machine-readable storage medium of claim 21, wherein the instructions, when executed by the processor, cause a barcode reading and weighing apparatus to:
   determine an identity of the POS system;
   identify the previously defined protocol based on an identity of the POS system; and
   select the overhead information as one of a plurality of predefined status bits of the protocol.

24. The non-transitory machine-readable storage medium of claim 21, wherein the instructions, when executed by the processor, cause a barcode reading and weighing apparatus to provide at the barcode reading and weighing apparatus an indication of the off-platter weigh condition.

25. The non-transitory machine-readable storage medium of claim 21, wherein the overhead information is a status bit of the previously defined protocol.

26. The non-transitory machine-readable storage medium of claim 25, wherein the status bit, when set, indicates the weight encoded in the weight-conveying field is inaccurate due to a condition other than the off-platter weigh condition.

27. The non-transitory machine-readable storage medium of claim 25, wherein the status bit is at least one of a "scale in motion" status bit, a "weight data not included" status bit, a "scale under zero" status bit, a "scale over capacity" status bit, or a "read error" status bit.

\* \* \* \* \*